(12) United States Patent
Ohno

(10) Patent No.: US 8,649,109 B2
(45) Date of Patent: Feb. 11, 2014

(54) LENS HOLDER

(75) Inventor: Hirokazu Ohno, Matsumoto (JP)

(73) Assignee: Nittoh Kogaku KK, Nagano (JP)

( * ) Notice: Subject to any disclaimer, the term of this patent is extended or adjusted under 35 U.S.C. 154(b) by 15 days.

(21) Appl. No.: 13/509,000

(22) PCT Filed: Nov. 12, 2010

(86) PCT No.: PCT/JP2010/006677
§ 371 (c)(1),
(2), (4) Date: Jul. 25, 2012

(87) PCT Pub. No.: WO2011/058762
PCT Pub. Date: May 19, 2011

(65) Prior Publication Data
US 2012/0281297 A1    Nov. 8, 2012

(30) Foreign Application Priority Data
Nov. 12, 2009 (JP) ................................ 2009-258842

(51) Int. Cl.
*G02B 15/14* (2006.01)
*H04N 5/225* (2006.01)

(52) U.S. Cl.
USPC ............ 359/700; 359/704; 359/703; 348/340

(58) Field of Classification Search
CPC ............ G02B 7/022; G02B 7/08; G03B 5/00; H04N 5/2254
USPC .......... 348/340; 359/694, 696, 699, 700, 703, 359/704, 826
See application file for complete search history.

(56) References Cited

U.S. PATENT DOCUMENTS 8,369,025 B2 * 2/2013 Suzuki .......................... 359/700
8,456,754 B2 * 6/2013 Tsuji et al. .................... 359/700
8,456,755 B2 * 6/2013 Shinano et al. ............... 359/700

(Continued)

FOREIGN PATENT DOCUMENTS

| JP | 2003-302567 | 10/2003 |
|----|-------------|---------|
| JP | 2004-198499 | 7/2004 |
| JP | 2008-111942 | 5/2008 |
| JP | 2008-256899 | 10/2008 |

OTHER PUBLICATIONS

PCT, International Search Report, International Application No. PCT/JP2010/006677 (mailed Dec. 7, 2010, published May 19, 2011).

(Continued)

*Primary Examiner* — David N Spector
(74) *Attorney, Agent, or Firm* — Thompson Hine LLP

(57) ABSTRACT

A lens holder includes: a first barrel with a plurality of helicoidal grooves that extend from a base portion to an end portion and at positions with rotational symmetry; and a second barrel with a plurality of protrusions that respectively enter the plurality of helicoidal grooves. The helicoidal grooves are respectively divided into helicoidal groove sections in multiple stages with a helicoidal groove section on a base portion side and a helicoidal groove section on an end portion side being disposed at angles that do not overlap. The first barrel includes circumferential grooves on the middle portion and circumferential grooves on the end portion. The middle circumferential grooves connect the end on the end side of the helicoidal groove sections on the base side to the end on the base side of the helicoidal groove sections on the end side and guide the protrusions in the circumferential direction.

9 Claims, 8 Drawing Sheets

(56) References Cited

U.S. PATENT DOCUMENTS

| | | | |
|---|---|---|---|
| 8,508,858 B2* | 8/2013 | Shintani | ........................ 359/700 |
| 2003/0147146 A1 | 8/2003 | Mikami | |
| 2005/0212946 A1 | 9/2005 | Mikami | |

OTHER PUBLICATIONS

PCT/JP2010006677; Notification of Transmittal of Translation of International Preliminary Report on Patentability, mailed Jun. 21, 2012; 6 pages.

* cited by examiner (a)  (b)

LENS HOLDER

TECHNICAL FIELD

The present invention relates to a lens holder that supports a plurality of lenses or a plurality of lens groups.

BACKGROUND ART

Japanese Laid-Open Patent Publication No. 2008-256899 discloses a lens barrel including: a first cylindrical member having a helicoidal screw groove portion and a groove portion in the circumferential direction that continues from the helicoidal screw groove portion on an inner circumference thereof; and a second cylindrical member having, on an outer circumference thereof, a helicoidal screw thread portion that is screwed onto the helicoidal screw groove portion and engages the groove portion in the circumferential direction. With such lens barrel, to increase the mechanical strength even when the cylindrical members receive a force in the optical axis direction, a reinforcing member of a different material to the member that constructs the helicoidal screw thread portion of the second cylindrical member is provided on part of the helicoidal screw thread portion.

DISCLOSURE OF THE INVENTION

In fields such as image pickup apparatuses and projector apparatuses, the overall sizes of apparatuses are being made progressively slimmer. For this reason, there is demand for a zoom lens system used in an image pickup apparatus and a projector apparatus and for a lens holder used in such a zoom lens system to be capable of being stored in the body of a slimmer apparatus during storage (i.e., when the apparatus is not in use). A lens holder also needs to be sufficiently strong to support a lens system during use.

One aspect of the present invention is a lens holder including: a first barrel including a plurality of helicoidal grooves that extend from a base portion to an end portion at positions with rotational symmetry; a second barrel including a plurality of protrusions that respectively enter the plurality of helicoidal grooves; and a lens frame that is supported on at least one of the first barrel and the second barrel via at least one other barrel and has at least one lens attached thereto. The plurality of helicoidal grooves respectively include helicoidal groove sections (portions) in multiple stages that are connected by circumferential grooves on the middle portion that guide the protrusions in the circumferential direction. In addition, the first barrel includes circumferential grooves on the end portion that join to the end portion side of helicoidal groove sections closest to the end side out of the helicoidal groove portions in multiple stages and guides the protrusions in the circumferential direction.

In this lens holder, the first barrel and the second barrel move relative to one another according to the combination of protrusions that enter the helicoidal grooves and move along the helicoidal grooves, i.e., in a so-called "helicoid". With this lens holder, according to the helicoids, it is possible to change the relative positions of the first barrel and the second barrel along the optical axis. In addition, when the protrusions are guided to the circumferential grooves formed on the middle portion and the end portion, the first barrel and the second barrel are capable of rotating relative to one another without changing the relative positions of the first barrel and the second barrel along the optical axis.

Accordingly with this lens holder, by using the mufti-stage helicoidal grooves, it is possible to move the positions along the optical axis of lenses attached to the lens frame, and also by rotating the first barrel and the second barrel relative to one another using the circumferential grooves on the middle and end portion, it is possible to move another barrel that supports a lens frame along the optical axis and to control the position along the optical axis of the lenses attached to the lens frame.

Since the protrusions do not move in the optical axis direction when the protrusions have entered the circumferential grooves on the middle or end portion, it is possible to maintain the relative positions of the first barrel and the second barrel with comparatively high strength with respect to forces (external forces) in the optical axis direction. Accordingly, in this lens holder, the connection strength of the first barrel and the second barrel is increased by the protrusions entering the circumferential grooves while the first barrel and the second barrel are moving in the optical axis direction on the muftistage helicoidal grooves, which means that it is possible to improve the positional precision of other barrels that move inside such barrels and/or the positional precision of the lenses supported by the lens frame.

In addition, in this lens holder, part of the circumferential groove on the end portion should preferably be disposed so as to overlap the end side of the helicoidal groove section on the base side out of the multi-stage helicoidal groove sections or the circumferential groove on the middle portion joined thereto. That is, it is desirable that the plurality of helicoidal grooves include a first helicoidal groove and a second helicoidal groove that is adjacent to the first helicoidal groove, and that at least part of the circumferential groove formed on the end portion of the first helicoidal groove is arranged so as to overlap an end side of the helicoidal groove section closest to the base side of the second helicoidal groove or the circumferential groove on the middle portion joined thereto.

In this lens holder, the circumferential grooves on the end portion and one or a plurality of the circumferential grooves on the middle portion are joined by at least one helicoidal groove section disposed therebetween. Since the circumferential grooves on the end and the middle portions have different positions along the optical axis direction, it is possible for such grooves to overlap about the optical axis. This means that the range (rotation range, angle range) through which the first barrel and the second barrel are capable of relative rotation is increased. Accordingly, by rotating the first barrel and the second barrel, another barrel is caused to move a greater and longer range along the optical axis. This means that it is possible to reduce the length along the optical axis of the first barrel and the second barrel and that it is possible to provide a lens holder that can be stored in the body of a slimmer apparatus or to provide a lens holder in which the lenses move by a greater distance. There is also greater design freedom for the cam grooves for driving the lens groups supported by such lens holder. As one example, it is possible to make the slope of the cam grooves more gradual and to move the lens groups smoothly and with high precision.

If the lens holder includes a plurality of zoom positions where movement in the optical axis direction automatically stops, it is preferable, at the plurality of zoom positions, for the protrusions to be inserted in the circumferential grooves on the middle or the end portion. As described above, the engagement between the protrusions and the circumferential grooves has high mechanical strength. Accordingly, by having the protrusions inserted into the circumferential grooves at the plurality of zoom positions where the movement in the optical axis direction automatically stops and which are points where the lens system included in this lens holder is actually used, it is possible to increase the mechanical strength of the lens holder and to maintain high positional precision for the plurality of lenses supported by the lens holder. This means that it is possible to provide a lens system with more stabilized optical performance at the positions where the lens system is used.

With this lens holder, the protrusions should preferably be tabs that extend in the circumferential direction. Protrusions in the form of tabs that extend in the circumferential direction enter the circumferential grooves on the end portion and the middle portion and rotate with comparatively little resistance. On the other hand, since the contact area in the optical axis direction between the circumferential grooves and tab-shaped protrusions is large, it is possible to further increase the connection strength in the optical axis direction. For example, a bayonet-type engagement level of strength is obtained. Also, since the helicoidal grooves are formed in spirals, even when protrusions in the form of tabs that extend in the circumferential direction are used, such protrusions can be guided by the mufti-stage helicoidal grooves to move the first and second barrels in the optical axis direction.

The first barrel should preferably be the outermost part of the lens holder. Having the first barrel and the second barrel engage one another via the circumferential grooves and the protrusions is comparatively strong against external shocks. Accordingly, by disposing the first barrel furthest to the outside, it is possible to suppress the effect of external forces and shocks on the other barrels, lens frames, lenses, and the like housed on the inside of the second barrel.

In one preferred embodiment of this lens holder, the plurality of helicoidal grooves include three helicoidal grooves disposed at three positions with rotational symmetry, the three helicoidal grooves are each divided into helicoidal groove sections in two stages, and a first helicoidal groove section at the base side and the second helicoidal groove section at the end side are disposed at angles that do not overlap. In this case, the first barrel includes, in addition to the three helicoidal grooves, circumferential grooves on the middle portion that connect an end side of each first helicoidal groove section and a base side of each second helicoidal groove section, and circumferential grooves on the end section that join to the end sides of the second helicoidal groove sections.

Another aspect of the present invention is a zoom lens system including the lens holder described above and at least one lens held in the lens frame of the lens holder. By using the lens holder described above, it is possible to construct a lens system that is compact and where the distance moved along the optical axis is large, so that it is possible to provide a lens system that is capable of being stored in a slim body and can achieve a large movement distance for the lenses. This zoom lens system can be favorably used in an image pickup apparatus or a projector apparatus, for example.

That is, another aspect of the present invention is an image pickup apparatus including the zoom lens system described above and an image pickup unit that acquires an image formed by the zoom lens system. By doing so, it is possible to obtain a slim and/or small image pickup apparatus.

Yet another aspect of the present invention is a projector apparatus including the zoom lens system described above, and an image forming unit that forms an image to be projected by the zoom lens system. By doing so, it is possible to obtain a slim and/or small projector apparatus.

BRIEF DESCRIPTION OF THE DRAWINGS

FIG. 1(a) shows the image pickup apparatus when the zoom lens system is in an image pickup state and FIG. 1(b) shows the image pickup apparatus when the zoom lens system is in a stored state.

DETAIL DESCRIPTION

Figure 1:
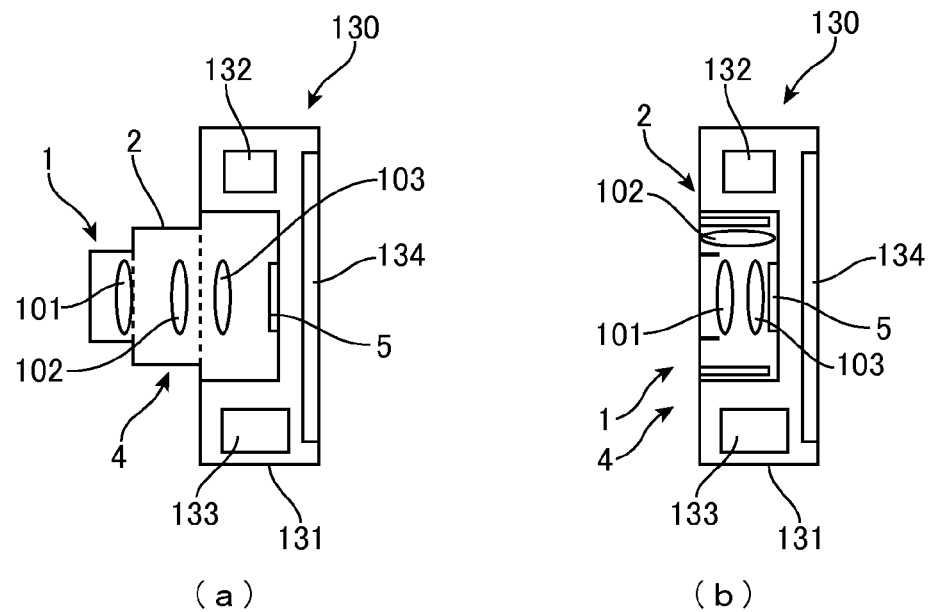
FIG. 1 is a series of diagrams showing the overall construction of one example of an image pickup apparatus including a zoom lens system according to an embodiment of the present invention, where

An embodiment of the present invention will now be described with reference to the drawings. FIGS. 1(a) and (b) show the overall construction of one example of an image pickup apparatus equipped with a zoom lens system. One example of an image pickup apparatus is a camera. As shown in FIGS. 1(a) and (b), the image pickup apparatus (camera) 130 according to the present embodiment includes a housing 131, an image pickup module 4 including a zoom lens system 1, a control unit 132 that controls the image pickup apparatus 130, and a motor 133 for driving the zoom lens system 1. As the housing 131, a housing in a overall slim and flat shape, such as a box shape, is used. The zoom lens system 1 included in the image pickup module 4 includes a lens holder 2 comprising barrels on multiple stages that extend outward and a lens system supported by the lens holder 2 that includes a first lens group 101, a second lens group 102, and a third lens group 103. In the zoom lens system 1, the outward extension of the lens holder 2 and the lengthening and shortening that follow afterward are controlled by having a motor 133 rotate a rotating barrel that is included in the lens holder 2.

As shown in FIG. 1(a), when the lens holder 2 has extended outward, the zoom lens system 1 is placed in a state where the zoom lens system 1 projects outward in front of the housing 131 and image pickup is possible ("image pickup state"). In this image pickup state, the lens holder 2 is capable of changing the positions (distances) along the optical axis of the first to third lens groups 101 to 103, and is capable of zooming in a range between wide angle ("Wide") and telephoto ("Tele") ends. On the other hand, as shown in FIG. 1(b), when the lens holder 2 is folded up, the zoom lens system 1 is placed in a parked state where the zoom lens system 1 is stored in the housing 131 ("stored state").

On the rear surface of the housing 131, the image pickup apparatus 130 also includes a display apparatus 134 that displays an image formed on the image pickup unit 5 by the zoom lens system 1. As the display apparatus 134, it is possible to use a liquid crystal display apparatus, for example. The image pickup apparatus 130 is capable of storing the zoom lens system 1 inside the housing 131 and is therefore compact during carrying. On the other hand, since it is possible to extend the multi-stage lens holder 2 when picking up images, it is possible to provide an image pickup apparatus 130 that has a large (high) zoom ratio ("magnification", "range of magnification").

Figure 2:
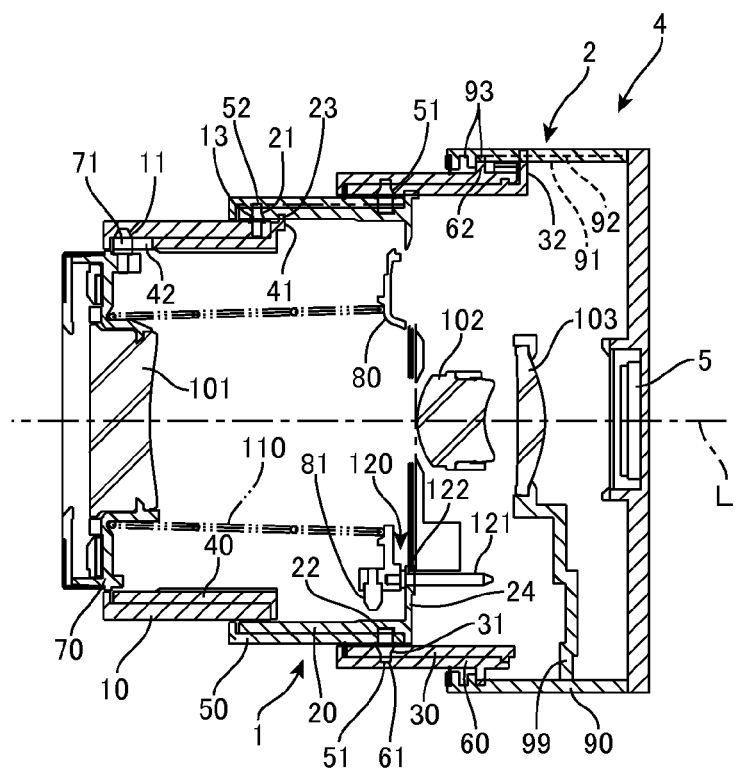
FIG. 2 is a cross-sectional view showing the zoom lens system at a Wide position.
Figure 3:
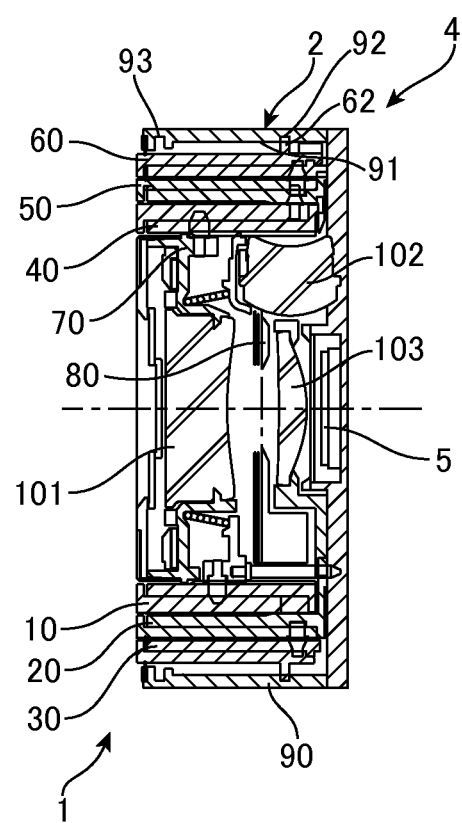
FIG. 3 is a cross-sectional view showing the zoom lens system in the stored state.

FIG. 2 and FIG. 3 show the overall construction of the image pickup module 4 by way of cross-sectional views. FIG. 2 shows a state where the image pickup module 4 is at the wide position. The expression "wide position" here refers to a state where the zoom lens system 1 is set at "wide" (the wide-angle end). The wide position is the position at which the lens holder 2 stops immediately after extending outward from the parked state. FIG. 3 shows the parked state of the image pickup module 4.

The image pickup module 4 includes the lens holder 2 and the first to third lens groups 101 to 103 that are respectively supported by the lens holder 2. The zoom lens system 1 includes the lens holder 2 and the lens groups 101 to 103 of the image pickup module 4, and the image pickup unit 5 is disposed to the rear on the optical axis of the zoom lens system 1. The image pickup unit 5 is a unit that acquires an image formed by the zoom lens system 1 and is typically a semiconductor image pickup element such as a CCD or a CMOS. The image formed on the image pickup unit 5 by the zoom lens system 1 is stored as digital data in a memory (not shown) provided inside the housing 131.

Figure 4:
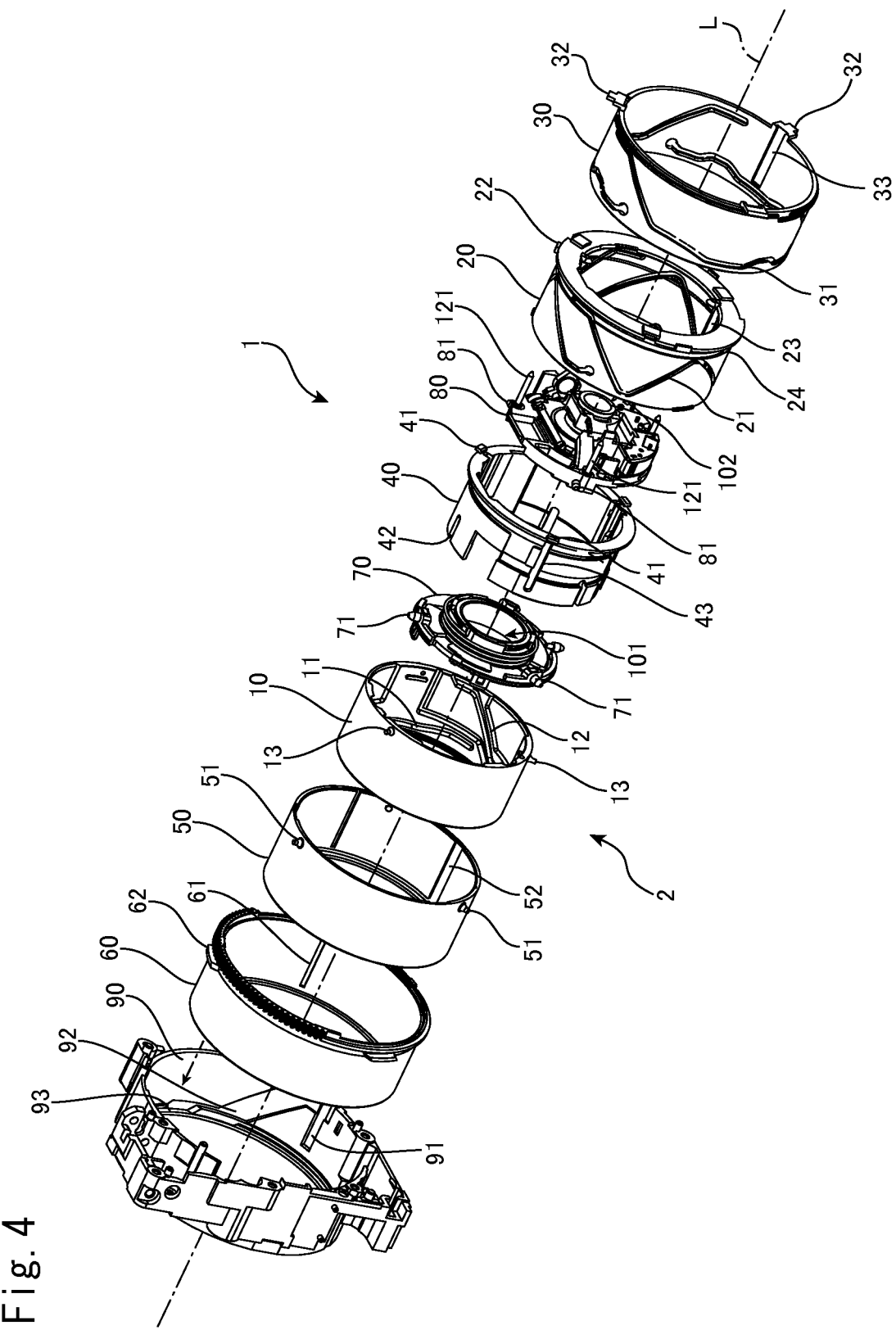
FIG. 4 is an exploded perspective view showing the overall construction of the zoom lens system.

FIG. 4 shows the construction of the zoom lens system 1 by way of an exploded perspective view. The zoom lens system 1 described above includes the first lens group 101 that is supported by a first lens frame 70 of the lens holder 2, the second lens group 102 that is supported by a second lens frame 80 of the lens holder 2, and the third lens group 103 that is supported by a third lens frame 99 of the lens holder 2, with the third lens frame 99 having been omitted from FIG. 4.

The lens holder 2 has the various parts (elements) shown in FIG. 4 assembled inside a base barrel ("first barrel" or "base") 90 from the right side (rear) shown in FIG. 4 and is constructed so as to extend outward from the first barrel 90 to the left (forwards). In the parked state, all of the elements are stored in the base 90. The lens holder 2 is incorporated via the first barrel 90 inside the image pickup apparatus 130. That is, the base 90 is fixed to the apparatus 130 and does not move in either the optical axis direction or the circumferential direction. Hereinafter the base (first barrel) 90 is referred to as the "fixed barrel". The third lens frame 99 is supported on this fixed barrel 90 which is the outermost part of the lens holder 2.

The lens holder 2 has a mufti-stage construction where a number of barrels are housed in an overlapping state inside the fixed barrel 90, with such barrels lengthening and shortening. Aside from the fixed barrel 90, the lens holder 2 includes a first cam barrel 10, a second cam barrel 20, and a third cam barrel 30. In addition, the lens holder 2 includes a first cylinder 40 that moves together with the first cam barrel 10, a second cylinder 50 that moves together with the second cam barrel 20, and a third cylinder (or "second barrel") 60 that moves together with the third cam barrel 30. Such barrels 10, 20, 30, 40, 50, 60, and 90 are all barrels whose external forms are substantially circular cylinders.

In addition, the lens holder 2 supports the lens groups 101, 102, and 103 via the respective lens frames 70, 80, and 99, and by changing the positions in the optical axis L direction of the first lens groups 101, 102, and 103 using the cam barrels 10 to 30 described above, it is possible to variably change the distances between the lens groups 101, 102 and 103.

The first cam barrel 10 supports the first lens frame 70 that holds the first lens group 101 and is a cam barrel that is capable of receiving and supporting the second lens frame 80 that holds the second lens group 102. Accordingly, the first cam barrel 10 is a cam barrel that changes the distance between the first lens group 101 and the second lens group 102. In the present embodiment, a rotating cam barrel that rotates around the optical axis L is used as the first cam barrel 10. The first cylinder ("advancing barrel") 40 that advances (moves forward and back) along the optical axis L direction is housed inside the first cam barrel 10, and the first lens frame 70 and the second lens frame 80 advance inside the first cam barrel 10 due to the first cylinder 40. The first cam barrel 10 is referred to below as the "rotating cam barrel" and the first cylinder 40 as the "advancing barrel".

Figure 5:
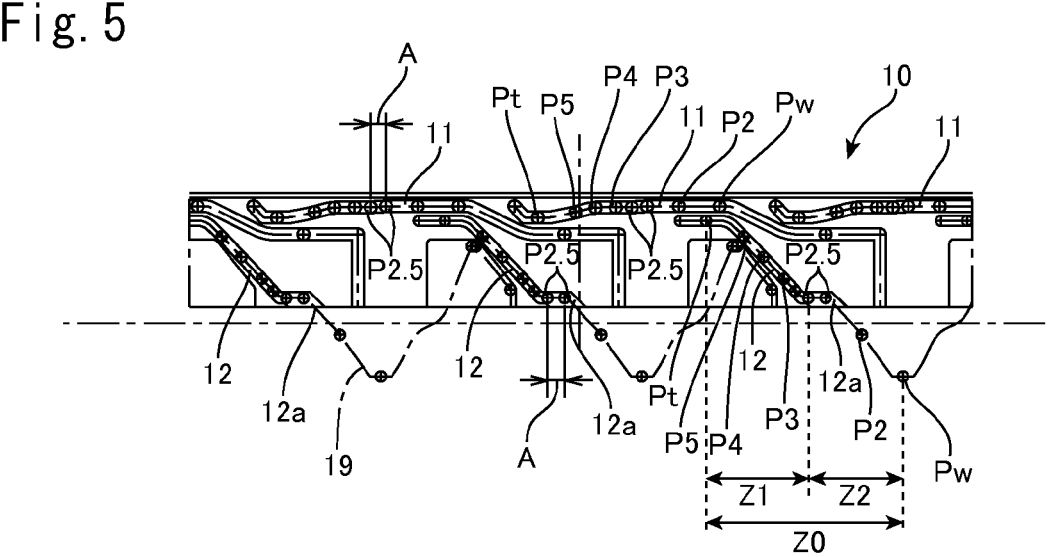
FIG. 5 is a view showing the inner surface of a first cam barrel (rotating cam barrel).

FIG. 5 shows a state where the cam grooves provided on the inside of the first cam barrel 10 have been expanded in the circumferential direction. The first cam barrel 10 includes, on an inner wall surface thereof, three first cam grooves 11 for moving the first lens frame 70 forward and backward along the optical axis L and three second cam grooves 12 for moving the second lens frame 80 forward and backward along the optical axis L. The three first cam grooves 11 are formed with the same shape with a pitch that is 120° apart. In the same way, the three second cam grooves 12 are formed with the same shape with a pitch that is 120° apart.

So long as not indicated otherwise, the cam grooves and the cam pins described below are fundamentally formed at three symmetrical positions around the optical axis L By supporting the barrels and the positions of the frames at three positions around the optical axis L, it is possible to achieve high precision for the inclinations and positions of the lens groups and surfaces of the respective lenses supported by the barrels with no change of inclination to the plane that are perpendicular to the optical axis L.

The first lens frame 70 is a ring or barrel shaped member and the first lens group 101 composed of a plurality of lenses is attached inside the first lens frame 70. Three cam pins 71 that are cam pins that protrude outward in the radial direction and are respectively inserted into the three first cam grooves 11 are provided around the first lens frame 70. The cam pins 71 are also disposed at three symmetrical positions.

The second lens frame 80 is a ring or barrel shaped member and the second lens group 102 composed of a plurality of lenses is attached inside the second lens frame 80. The second lens frame 80 has a mechanism for flipping up the second lens group 102 to a withdrawn position in the parked state. Three second cam pins 81 that are cam pins that protrude outward in the radial direction and are respectively inserted in the three second cam grooves 12 are provided around the second lens frame 80. The cam pins 81 are also disposed at three symmetrical positions.

The second cam barrel 20 disposed on the outside of the rotating cam barrel 10 is an advancing cam barrel that advances straightly (linear moves forward and back) along the optical axis L direction. The second cam barrel 20 is housed in the rotating barrel (first rotating barrel or first revolving barrel) that is the second cylinder 50 that rotates inside the third cam barrel 30 described later and moves forward and back along the optical axis L direction together with the second cylinder 50. The second cam barrel 20 is referred to below as the "first advancing cam barrel" and the second cylinder 50 as the "middle barrel".

The first advancing cam barrel 20 includes three third cam grooves 21 for moving the rotating cam barrel 10 forward and back along the optical axis L direction. The three third cam grooves 21 are formed with the same shape at three symmetrical positions, that is, with a pitch so as to be 120° apart. The third cam grooves 21 are provided so as to pass through the first advancing cam barrel 20.

Corresponding to the third cam grooves 21, three third cam pins 13 that are cam pins that protrude outward in the radial direction and are respectively inserted in the three third cam grooves 21 are provided at three symmetrical positions on the rear end side (on the fixed barrel 90 side when the rotating cam barrel 10 has extended outward) of the circumferential wall of the rotating cam barrel 10 described earlier. Accordingly, by rotating the rotating cam barrel 10 inside the first advancing cam barrel 20, the relative positions along the optical axis L of the rotating cam barrel 10 and the first advancing cam barrel 20 change. In this way, the first advancing cam barrel 20 functions so as to be capable, together with the second advancing cam barrel 30 described later, of changing the distance between the fixed barrel 90 and the rotating cam barrel 10.

The third cam barrel 30 disposed on the outside of the first advancing cam barrel 20 is an advancing cam barrel that advances straightly (linear moves forward and back) along the optical axis L direction. The third cam barrel 30 is housed in a rotating barrel (the second rotating barrel or second revolving barrel) that is the third cylinder 60 that rotates inside the fixed barrel 90, and moves forward and back along the optical axis L direction together with the third cylinder 60. The third cam barrel 30 is referred to below as the "second advancing cam barrel" and the third cylinder 60 as the "rotating barrel".

The second advancing cam barrel 30 includes three fourth cam grooves 31 for moving the first advancing cam barrel 20 forward and back along the optical axis L direction. The fourth cam grooves 31 have the same shape and are formed at three symmetrical positions. These fourth cam grooves 31 are provided so as to pass through the second advancing cam barrel 30.

Corresponding to the fourth cam grooves 31, three fourth cam pins 51 that are cam pins that protrude outward in the radial direction and are respectively inserted in the three fourth cam grooves 51 are provided at three symmetrical positions on the rear end side (on the fixed barrel 90 side when the middle barrel 50 has extended outward) of the circumferential wall of the middle barrel 50 described earlier. Accordingly, by rotating the middle barrel 50 inside the second advancing cam barrel 30, the relative positions along the optical axis L of the middle barrel 50 and the second advancing cam barrel 30 change. In this way, the second advancing cam barrel 30 functions so as to be capable, together with the first advancing cam barrel 20, of changing the distance between the fixed barrel 90 and the rotating cam barrel 10.

The lens holder 2 is an assembly composed of such cylinders and is assembled and functions as described below. Note that the lens holder 2 is assembled so that other cylinders and the like are housed inside the fixed barrel 90 on the upper left in FIG. 4 and the assembled cylinders extend outward from the fixed barrel 90 toward the upper left.

First, on the inner wall surface of the fixed barrel (first barrel) 90 that is the outermost part, a plurality of grooves 91 that extend linearly in the optical axis L direction, three helicoidal grooves 92 that are spiral (or form part of a spiral), and three circumferential grooves 93 that respectively join the helicoidal grooves 92 are formed. Three protrusions (tabs) 62 protrude outward in the radial direction at the rear end side (on the fixed barrel 90 side when the lens holder 2 has extended outward) of the circumferential wall of the rotating barrel (the second barrel) 60. In addition, grooves 61 are provided along the optical axis L on the rotating barrel 60. The fixed barrel 90 is fixed to the housing 131 of the camera 130 as a base and the rotating barrel 60 is rotationally driven by the motor 133.

When the rotating barrel 60 rotates, the rotating barrel 60 is caused to extend outward to the left (toward the front) of the fixed barrel 90 due to the helicoidal grooves 92 and the tabs 62. The second advancing cam barrel 30 also extends outward toward the front together with the rotating barrel 60. Protrusions 32 that protrude outward in the radial direction from the rotating barrel 60 and enter the grooves 91 of the fixed barrel 90 are formed on the fixed barrel 90 side of the second advancing cam barrel 30. Accordingly, the second advancing cam barrel 30 moves together with the rotating barrel 60 along the optical axis L and linearly advances (moves) without rotating around the optical axis L. The relationship between the fixed barrel 90 and the rotating barrel 60 will be described in more detail later.

The fourth cam pins 51 of the middle barrel 50 housed in the rotating barrel 60 pass through the fourth cam grooves 31 of the second advancing cam barrel 30 and enter the grooves 61 of the rotating barrel 60. Accordingly, the middle barrel 50 rotates around the optical axis L together with (in synchronization with) the rotating barrel 60. Since the second advancing cam barrel 30 does not rotate but the middle barrel 50 rotates, the relative positions of (i) the second advancing cam barrel 30 and (ii) the middle barrel 50 and first advancing cam barrel 20 are controlled by the fourth cam grooves 31. Grooves 52 that linearly extend along the optical axis L are provided on the inner surface (i.e., on the inside) of the middle barrel 50 and grooves 33 that extend linearly along the optical axis L are also provided on the inner surface (i.e., on the inside) of the second advancing cam barrel 30.

Protrusions 22 that protrude outward in the radial direction from the middle barrel 50 and enter the linear grooves 33 of the second advancing cam barrel 30 are formed on the fixed barrel 90 side of the first advancing cam barrel 20. Accordingly, although the first advancing cam barrel 20 moves along the optical axis L together with the middle barrel 50, the first advancing cam barrel 20 linearly advances (moves) without rotating around the optical axis L.

The third cam pins 13 of the rotating cam barrel 10 housed in the middle barrel 50 pass through the third cam grooves 21 of the first advancing cam barrel 20 and enter the grooves 52 of the middle barrel 50. Accordingly, the rotating cam barrel 10 rotates together with (in synchronization with) the rotating barrel 60 and the middle barrel 50 around the optical axis L. Since the first advancing cam barrel 20 does not rotate but the rotating cam barrel 10 rotates, the relative positions of the first advancing cam barrel 20 and the rotating cam barrel 10 are controlled by the third cam grooves 21. Grooves 23 that linearly extend along the optical axis L are provided on an inner surface (i.e., on an inside of) the first advancing cam barrel 20.

Protrusions 41 that protrude outward from the rotating cam barrel 10 and enter the linear grooves 23 of the first advancing cam barrel 20 are formed on the fixed barrel 90 side of the advancing barrel 40 housed in the rotating cam barrel 10. Accordingly, although the advancing barrel 40 moves along the optical axis L together with the rotating cam barrel 10, the advancing barrel 40 linearly advances (moves) without rotating around the optical axis L.

Cutaways 42 and 43 that linearly extend in the optical axis L direction are formed in the advancing barrel 40. The first cam pins 71 of the first lens frame 70 pass through the cutaways 42 of the advancing barrel 40 and fit into the first cam grooves 11 of the rotating cam barrel 10. Accordingly, since the first lens frame 70 linearly advances (moves) and the rotating cam barrel 10 rotates, the relative positions along the optical axis L of the first lens frame 70 and the rotating cam barrel 10 are controlled by the first cam grooves 11 of the rotating cam barrel 10.

Also, the second cam pins 81 of the second lens frame 80 pass through the cutaways 43 of the advancing barrel 40 and enter the second cam grooves 12 of the rotating cam barrel 10. Accordingly, since the second lens frame 80 linearly advances (moves) and the rotating cam barrel 10 rotates, the relative positions along the optical axis L of the second lens frame 80 and the rotating cam barrel 10 are controlled by the second cam grooves 12 of the rotating cam barrel 10.

The second lens frame 80 transfers between a state where the second lens frame 80 is supported on the first advancing cam barrel 20 and a state where the second lens frame 80 is supported on the rotating cam barrel 10. Accordingly, the first advancing cam barrel 20 sides of the cutaways (slots) 43 in the advancing barrel 40 are open and are capable of receiving the second cam pins 81 of the second lens frame 80 during zooming (i.e., on the range of magnification). As shown in FIG. 5, the second cam grooves 12 are also the same with the first advancing cam barrel 20 sides being open so that the second cam grooves 12 are capable of receiving the second cam pins 81 of the second lens frame 80 during zooming (i.e., on the range of magnification). For this reason, as shown in FIG. 5, the gap (distance) between the first lens frame 70 and the second lens frame 80 can be controlled beyond the range of the rotating cam barrel 10.

Note that in FIG. 5, the path 19 that extends beyond the second cam grooves 12 of the rotating cam barrel 10 (shown by the dot-dash lines at the bottom of FIG. 5) shows a state where the second lens frame 80 moves together with the first advancing cam barrel 20. In this state, movement of the second lens frame 80 is synchronized with the first advancing cam barrel 20 and the position of the rotating cam barrel 10 is controlled by the third cam grooves 21 of the first advancing cam barrel 20. Accordingly, the path 19 is the inverse of the third cam groove 21 parts of the first advancing cam barrel 20. Note that the path 19 from the wide position Pw to storage includes movement that flips the second lens frame 80 toward a withdrawn position.

With the lens holder 2 according to the present embodiment and the zoom lens system 1 equipped with such, by rotating the rotating barrel 60, the middle barrel 50, and the rotating cam barrel 10 in synchronization around the optical axis L using the motor 133, the extended amount of the respective barrels and the positions along the optical axis L of the respective lens groups 101, 102, and 103 are controlled, and an operation until the storage position (parked state, parked position) shown in FIG. 3 is reached, including for example the flipping-up operation of the second lens group 102 is also controlled. That is, with the zoom lens system 1, by having the motor 133 rotationally drive the rotating barrel 60 in a first direction, it is possible to control the extending of the respective barrels of the lens holder 2 in the order: parked position Pp; Wide (wide-angle end) position Pw; and Tele (telephoto end) position Pt. Also, by having the motor 133 rotationally drive the rotating barrel 60 in the opposite direction, it is possible to store away the respective barrels of the lens holder 2 in the order: Tele position Pt; Wide position Pw; and then parked position Pp, so that it is possible to switch between the lens holder 2 being extended out and stored away.

Also, the zoom lens system 1 includes a plurality of zoom positions at which the rotation of the rotating barrel 60 is automatically stopped during zooming (i.e., during the magnification range, between the Wide position Pw and the Tele position Pt). That is, at positions aside from such zoom positions, the motor 133 rotates the rotating barrel 60 continuously toward the next zoom position and such rotation is not stopped. Accordingly, the zoom positions along the optical axis L at which image pickup can be carried out using the first lens group 101, the second lens group 102, the third lens group 103 and the image pickup unit (image pickup element) 5 are only the plurality of zoom positions where rotation automatically stops. More specifically, when a zooming operation is carried out, rotation automatically stops at the Wide position Pw, a second zoom position P2, a third zoom position P3, a fourth zoom position P4, a fifth zoom position P5, and the Tele position Pt and the user is capable of acquiring images at such zoom positions.

In FIG. 5, the positions at which the cam pins 71 and 81 stop for the respective zoom positions are shown. During zooming, the position at which the second lens frame 80 is transferred is between the second zoom position P2 and the third zoom position P3 (as "position P2.5") and the transfer zone is shown by the symbol A.

Figure 6:
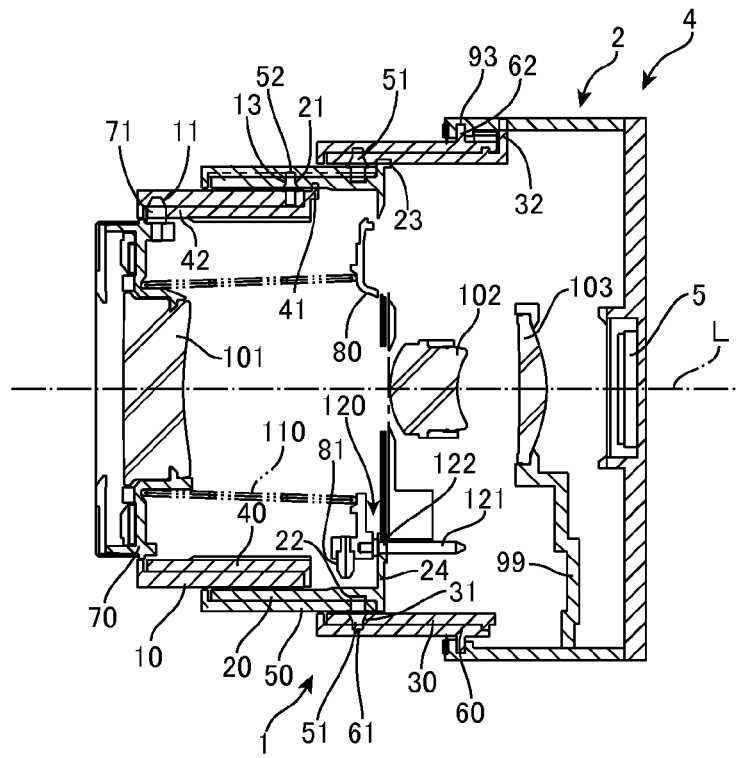
FIG. 6 is a cross-sectional view showing the zoom lens system at a second zoom position.
Figure 7:
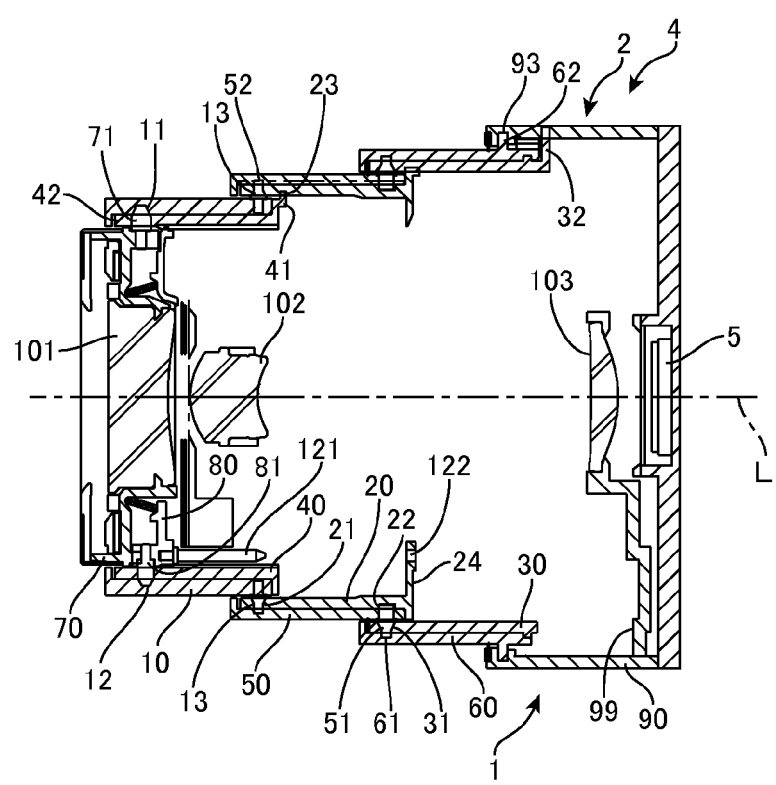
FIG. 7 is a cross-sectional view showing the zoom lens system at a Tele position.

FIG. 6 shows the state of the second zoom position P2 that is the next stopping position following the wide position Pw (see FIG. 2) by way of a cross-sectional view. FIG. 7 shows the state at the Tele position Pt by way of a cross-sectional view. As should be clear from these drawings, in the lens holder 2, in the magnification range (zoom range), the range in which the second lens frame 80 is moved by the rotating cam barrel 10 can be divided into two magnification ranges that are a range in which the second lens frame 80 is moved by the rotating cam barrel 10 and a range in which the second lens frame 80 is supported by the first advancing cam barrel 20 and moved by the second advancing cam barrel 30. FIG. 5 shows the magnification range (zoom range) Z0 from the Tele position Pt to the Wide position Pw divided into a first magnification range Z1 from the Tele position Pt via the fifth zoom position P5, the fourth zoom position P4, and the third zoom position P3 to the transfer position P2.5 and a second magnification range Z2 from the transfer position P2.5 via the second zoom position P2 to the Wide position Pw.

In the first magnification range Z1, the first lens frame 70 and the second lens frame 80 are supported by the rotating cam barrel (first cam barrel) 10, the second lens frame 80 moves forward and back along the optical axis L due to the second cam grooves 12 of the rotating cam barrel 10, and the distance between the first lens group 101 and the second lens group 102 along the optical axis L changes. In the second magnification range Z2, the first lens frame 70 is supported by the rotating cam barrel 10 and the second lens frame 80 is moved forward and back along the optical axis L by the fourth cam grooves 31 of the second advancing cam barrel (the third cam barrel) 30 while being supported by the first advancing cam barrel (the second cam barrel) 20 to change the distance along the optical axis L between the first lens group 101 and the second lens group 102.

With the lens holder 2, during a magnification operation where there is a move from the second magnification range Z2 to the first magnification range Z1 or a move in the opposite direction, at the boundary A between the first magnification ranges Z1 and Z2, the second lens frame 80 is transferred (moved over) between the first advancing cam barrel 20 and the rotating cam barrel 10. To do so, in the first magnification range Z1, the second lens frame 80 is capable of being moved by the second cam grooves 12 of the rotating cam barrel 10 and in the second magnification range Z2, the second lens frame 80 is supported by the first advancing cam barrel 20 and is moved by the fourth cam grooves 31 of the second advancing cam barrel 30. Accordingly, it is possible to make the distance moved by the second lens frame 80 in the optical axis L direction longer than the length along the optical axis L of the rotating cam barrel 10. Putting this another way, it is possible to make the length in the optical axis L direction of the rotating cam barrel 10 shorter than the distance moved by the second lens frame 80 in the optical axis L direction as required for magnification operations.

In addition, the lens holder 2 includes a means for biasing the second lens frame 80 in the direction of the first advancing cam barrel 20. The biasing means 110 is typically a coil spring. The coil spring 110 can be disposed between the first lens frame 70 and the second lens frame 80 and is capable of constantly applying a force to the second lens frame 80 in a direction away from the first lens frame 70. Use of a coil spring 110 as the biasing means is also preferable since it is possible to select a spring with an internal diameter that does not block the optical path between the first lens group 101 and the second lens group 102. In addition, if a coil spring 110 is used, at a position, such as during storage or at the Tele position Pt, where the distance between the first lens group 101 and the second lens group 102 is minimized, it is possible to make the compressed length smaller than the minimum distance between the first lens frame 70 and the second lens frame 80.

A part (bearing portion) 24 that receives the second lens frame 80 pressed or forced by the coil spring 110 is formed on the first advancing cam barrel 20. More specifically, in the present embodiment, the rear end of the first advancing cam barrel 20 (that is, the fixed barrel 90 side when extended outward) juts out so as to be bent over toward the inside, and a jutting portion (flange portion) is formed. This jutting portion forms the bearing portion 24.

When separated from the rotating cam barrel 10, the second lens frame 80 is pressed onto the bearing portion 24 of the first advancing cam barrel 20 by the coil spring 110 and moves in synchronization with the first advancing cam barrel 20 at the opposite end of the first advancing cam barrel 20 to the rotating cam barrel 10. Due to the pressing of the coil spring 110, the second lens frame 80 becomes integrated with the first advancing cam barrel 20 and even if the second lens frame 80 becomes separated from the second cam grooves 12 of the rotating cam barrel 10, the position of the second lens frame 80 along the optical axis L will be precisely controlled by the second advancing cam barrel 30.

Also, by supporting the second lens frame 80 at the opposite end of the first advancing cam barrel 20 to the rotating cam barrel 10 (i.e., the opposite side to the entry/exit side of the rotating cam barrel, the image pickup unit 5 side), it is possible to maximize the range for which the distance between the first lens group 101 and the second lens group 102 can be controlled. That is, by extending the rotating cam barrel 10 by the maximum amount from the first advancing cam barrel 20, it is possible to set the distance between the first lens group 101 and the second lens group 102 at the maximum obtained by the rotating cam barrel 10 and the first advancing cam barrel 20. For this reason, by using the rotating cam barrel 10 and the first advancing cam barrel 20 that are slim (i.e., have a short length) along the optical axis L, it is possible to obtain a sufficient distance for magnification. Accordingly, it is possible to minimize the size when the rotating cam barrel 10 is stored in the first advancing cam barrel 20.

The lens holder 2 also includes a guide mechanism 120 that extends in the optical axis L direction so that the second lens frame 80 contacts a predetermined position of the bearing portion 24 of the first advancing cam barrel 20. A typical guide mechanism 120 is a combination of rods (pins) 121 and cylinders that receive the rods. It is also possible to use rails or another guide mechanism.

In the second lens frame 80, three guide pins 121 that extend toward the rear in the optical axis L direction (toward the fixed barrel 90 after extending outward) are provided at three symmetrical positions. Also, three through-holes 122 through which the guide pins 121 pass are provided on the bearing portion 24 of the first advancing cam barrel 20. To facilitate entry of the guide pins 121 into the through-holes 122, the rear ends (i.e., the ends that extend toward the rear) are tapered or chamfered and the fronts of the through-holes 122 are widened in the form of funnels.

Accordingly, the second lens frame 80 advances along the optical axis L together with the first advancing cam barrel 20 without rotating around the optical axis L when supported by the first advancing cam barrel 20. For this reason, even if the second lens frame 80 becomes separated from the rotating cam barrel 10, the second lens frame 80 can be supported by the first advancing cam barrel 20 so as to linearly advance or move in a state which is optically the same as the state where the second lens frame 80 is driven by the rotating cam barrel 10. In addition, due to the guide pins 121 and the through-holes 122, the second lens frame 80 can be kept advancing linearly across a comparatively wide range before and after the second cam pins 81 of the second lens frame 80 enter and exit the second cam grooves 12 of the rotating cam barrel 10. It is possible to smoothly transfer the second lens frame 80 between the rotating cam barrel 10 and the first advancing cam barrel 20 and to eradicate problems such as the second cam pins 81 becoming separated from the second cam grooves 12 or the second cam pins 81 failing to enter the second cam grooves 12.

In addition, as shown in FIG. 5, to facilitate entry of the second cam pins 81 of the second lens frame 80 that moves together with the first advancing cam barrel 20, into the second cam grooves 12 of the rotating cam barrel 10, the second cam grooves 12 include parts 12a that are open in the direction of the first advancing cam barrel 20 (i.e., to the rear) along the optical axis L. Accordingly, when the second lens frame 80 is transferred between the rotating cam barrel 10 and the first advancing cam barrel 20, even if there is a phase misalignment within a tolerated range between the rotating cam barrel 10 and the second lens frame 80 around the optical axis L, it is still possible to eradicate problems where the second cam pins 81 become separated from the second cam grooves 12 or the cam pins 81 do not enter the second cam grooves 12. Even when the second lens frame 80 is transferred between the rotating cam barrel 10 and the first advancing cam barrel 20, the rotating barrel 60 is rotated by the motor 133 and the middle barrel 50 and the rotating cam barrel 10 are controlled by being rotated in synchronization with the rotating barrel 60.

In this way, the operation of the lens holder 2 and the zoom lens system 1 are controlled by the rotation of the rotating barrel 60. Accordingly, to precisely control the movement of the zoom lens system 1, it is preferable to achieve a sufficient range (rotation angle, angle range) through which the rotating barrel 60 is capable of rotating. In addition, it is desirable to connect using a mechanism to produce movement so that inclination, rattling, and the like are not produced between the respective barrels, for example, the rotating barrel 60 and the fixed barrel 90. To maintain a stable state of engagement, it is preferable for the rotating barrel 60 and the fixed barrel 90 to be engaged at at least three positions, and in the past the angle of rotation of the rotating barrel 60 was around 120° (360°/3) at most. On the other hand, with the lens holder 2 according to the present embodiment, by making the helicoidal grooves 92 provided in the fixed barrel 90 multistage helicoidal grooves, it is possible to achieve an angle of rotation that exceeds 120°.

Figure 8:
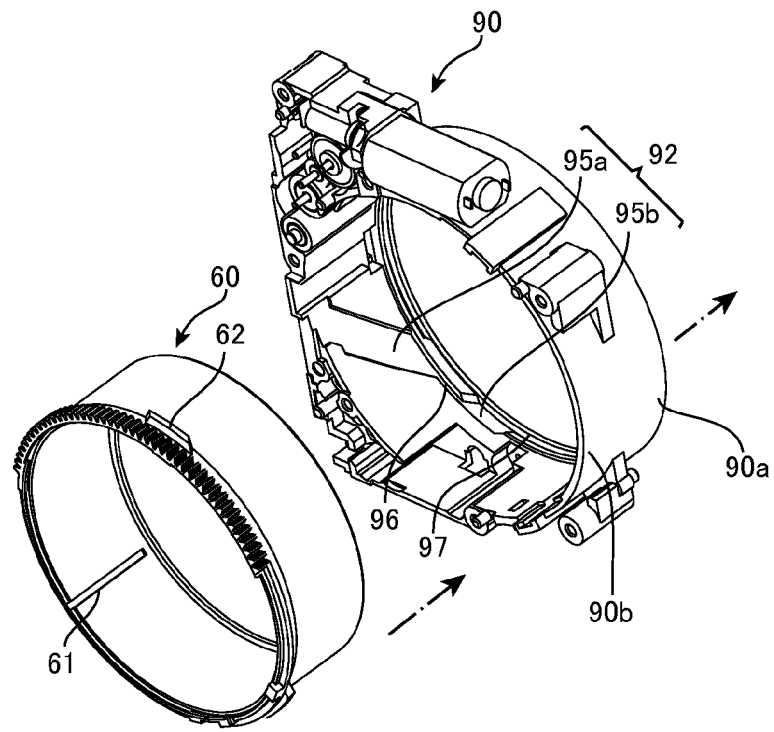
FIG. 8 is a perspective view showing a fixed barrel (first barrel) and a rotating barrel (second barrel).
Figure 9:
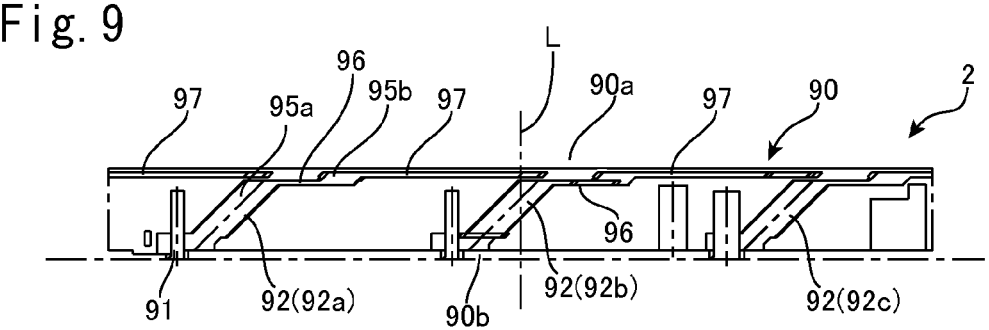
FIG. 9 is a view showing an inner surface of the fixed barrel (first barrel).
Figure 10:
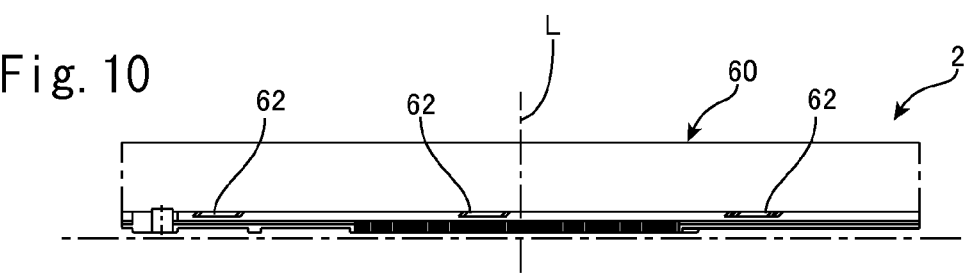
FIG. 10 is a view showing an outer surface of the rotating barrel (second barrel).
Figure 11:
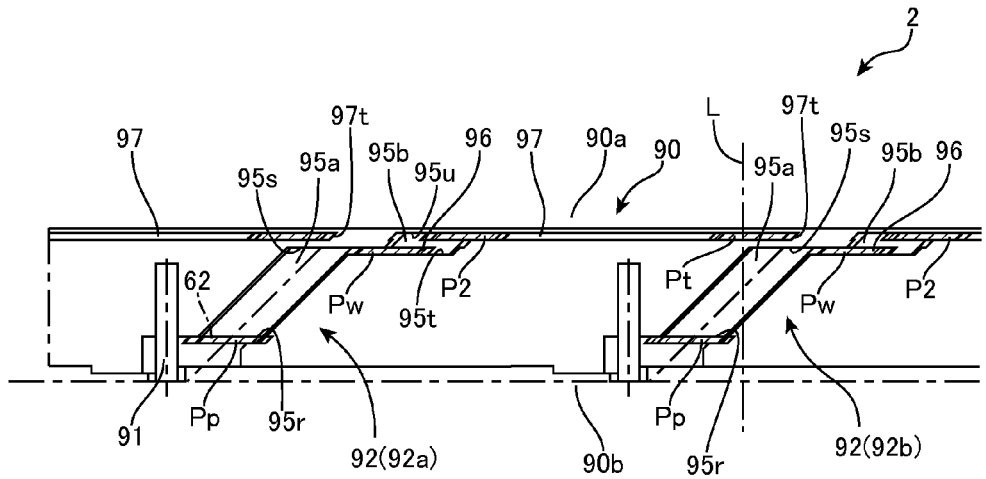
FIG. 11 is a diagram showing an enlargement of part of FIG. 9.

FIG. 8 shows the fixed barrel (first barrel) 90 and the rotating barrel (second barrel) 60 by way of a perspective view. In FIG. 8, the rotating barrel 60 is assembled in the fixed barrel 90 from the lower left and when the rotating barrel 60 rotates, the rotating barrel 60 extends out toward the upper right from the fixed barrel 90. FIG. 9 shows the inner surface of the fixed barrel (first barrel) 90 expanded in the circumferential direction. FIG. 10 shows the outer surface of the rotating barrel (second barrel) 60 expanded in the circumferential direction. FIG. 11 shows an enlargement of part of FIG. 9. In FIG. 11, the positions of the tabs 62 of the respective positions (the parked position Pp, the Wide position Pw, the second zoom position P2, the Tele position Pt) are shown.

As shown in FIGS. 8 to 11, on the inner surface of the fixed barrel 90, a plurality of helicoidal grooves 92 that extend from the base end side (base portion side or base side that is, the side 90b in which the rotating barrel 60 is inserted) toward the tip end portion side (end portion side, tip side or end side that is, the side 90a where the rotating barrel 60 extends outward) are formed at three positions with rotational symmetry. In the present embodiment, a first helicoidal groove 92a, a second helicoidal groove 92b, and a third helicoidal groove 92c are provided at a pitch of 120° at three symmetrical positions (three positions with rotational symmetry) on the inner surface of the fixed barrel 90. More specifically, the first helicoidal groove 92a is adjacent on the left to the second helicoidal groove 92b (on the left in FIG. 9), the second helicoidal groove 92b is adjacent on the left to the third helicoidal groove 92c (on the left in FIG. 9), and the third helicoidal groove 92c is adjacent on the left to the first helicoidal groove 92a (on the left in FIG. 9).

On the other hand, three protrusions 62 that enter (fit into) the helicoidal grooves 92a, 92b, 92c are formed so as to protrude outward in the radial direction on the fixed barrel 90 side of the circumferential wall of the rotating barrel 60. In the present embodiment, the protrusions 62 are tabs that extend in the circumferential direction.

The helicoidal grooves 92a, 92b, and 92c are each divided into multiple stages, which in the present embodiment are the two stages called the helicoidal groove sections (groove portions) 95a and 95b, and are connected by middle or in-between circumferential grooves 96. Note that since the helicoidal grooves 92a to 92c have fundamentally the same shape and construction, the following explanation refers to the "helicoidal groove 92" when focusing on one helicoidal groove 92 and refers to the helicoidal grooves 92a to 92c when describing the plurality of helicoidal grooves 92a to 92c.

Focusing on one helicoidal groove 92, the first helicoidal groove section 95a on the base portion side 90b and the second helicoidal groove section 95b on the end portion side 90a are disposed parallel to one another so as to not overlap in angle. The end 95s of the end portion side 90a of the first helicoidal groove section 95a and the end 95t of the base portion side 90b of the second helicoidal groove section 95b are connected by a middle circumferential groove 96 that guides a protrusion (tab) 62 of the rotating barrel 60 in the circumferential direction.

In addition, circumferential grooves 97 formed on the end portion that are each connected to an end 95u on the end portion side 90a of a second helicoidal groove section 95b and guide a protrusion 62 of the rotating barrel 60 in the circumferential direction are provided on the fixed barrel 90. Accordingly, three circumferential grooves 97 are formed on the end portion side 90a of the fixed barrel 90 at three symmetrical positions that join the helicoidal grooves 92a to 92c. The tabs 62 of the rotating barrel 60 each enter a helicoidal groove 92 and move from the end 95r of the base portion side 90b of the first helicoidal groove section 95a to the end 95s of the end portion side 90a, the in-between circumferential groove 96 on the middle portion, and from the end 95t of the base portion side 90b of the second helicoidal groove section 95b to the end 95u of the end portion side 90a and then onto the circumferential groove 97 on the end portion. To do so, the rotating barrel 60 is rotated by the motor 133 by a rotational angle (angle range) that covers the first helicoidal groove section 95a, the circumferential groove 96 on the middle portion, the second helicoidal groove section 95b, and also the circumferential groove 97 on the end portion.

In addition, as shown in FIG. 11, in the present embodiment, part (the end) 97t of the circumferential groove 97 on the end portion that joins to the second helicoidal groove section 95b that is the end side or tip side 90a of the helicoidal groove 92 is disposed so as to overlap, in the circumferential direction, part of the end 95s of the tip side 90a of the first helicoidal groove section 95a that is the section of the base side 90b of the adjacent helicoidal groove 92. For example, the part (end) 97t of the circumferential groove 97 on the end portion that joins the second helicoidal groove section 95b that is the section of the tip end side 90a of the first helicoidal groove 92a is disposed so as to overlap, in the circumferential direction, part of the end 95s of the tip end side 90a of the first helicoidal groove section 95a that is the section of the base side 90b of the second helicoidal groove 92b. Accordingly, the range through which the rotating barrel 60 can be rotated by the motor 133 can be expanded.

Figure 12:
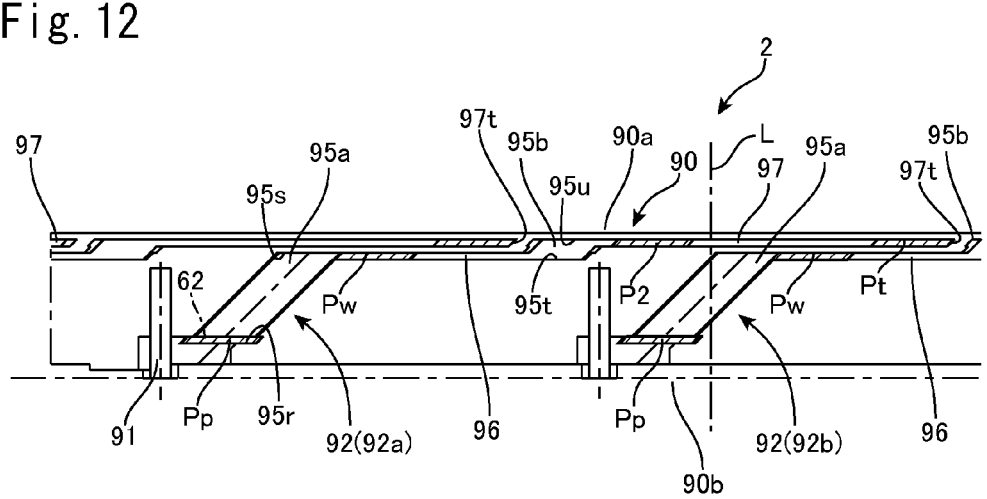
FIG. 12 is a diagram showing another example of a fixed barrel (first barrel) and shows an enlargement of part of the inner surface of the fixed barrel (first barrel).

FIG. 12 shows an enlargement of part of the inner surface of another example of the fixed barrel 90 where the end portion circumferential grooves 97 are extended in the circumferential direction. On this fixed barrel 90, part (the end) 97t of the end portion circumferential groove 97 that joins to the second helicoidal groove section 95b of the end portion side 90a of a helicoidal groove 92 is disposed so as to overlap, in the circumferential direction, the middle circumferential groove 96 of the adjacent helicoidal groove 92. As one example, part (the end) 97t of the end portion circumferential groove 97 that joins to the second helicoidal groove section 95b of the end portion side 90a of the first helicoidal groove 92a is disposed so as to overlap, in the circumferential direction, part of the middle circumferential groove 96 that joins to the end 95s of the end portion side 90a of the first helicoidal groove section 95a of the base portion side 90b of the second helicoidal groove 92b. Accordingly, the range through which the rotating barrel 60 can be rotated by the motor 133 can be expanded further.

In these lens holders 2, since the helicoidal grooves 92 are split into multiple stages and connected by the circumferential grooves 96 on the middle portion, the circumferential grooves 97 on the end portion and the circumferential grooves 96 on the middle portion is connected via the second helicoidal groove sections 95b disposed therebetween. Accordingly, the circumferential grooves 97 on the end portion and the tip side ends 95s on the tip end sides 90a of the first (base side) helicoidal groove sections 95a have different positions in the optical axis L direction. Also, the circumferential grooves 97 on the end portion and the middle circumferential grooves 96 that join to the ends 95s on the tip end sides 90a of the first helicoidal groove portions 95a have different positions in the optical axis L direction. This means that it is possible to dispose each circumferential groove 97 on the end portion so as to overlap, in the optical axis L direction, both the tip side end 95s of the first helicoidal groove portion 95a of the adjacent helicoidal groove 92 and the middle circumferential groove 96 that joins thereto. For this reason, it is possible to expand the angle range covered by the first helicoidal groove section 95a, the middle circumferential groove 96, the second helicoidal groove section 95b, and the end portion circumferential groove 97 and to further expand the range through which the rotating barrel 60 can be rotated by the motor 133.

In particular, with the helicoidal grooves 92 of this type, since it is possible to expand the angle range covered by the middle circumferential grooves 96 and the circumferential grooves 97 on the end portion, it is possible to expand the angle range where the middle barrel 50 and the rotating cam barrel 10 can be rotated in synchronization with rotation of the rotating barrel 60 from the Wide position Pw to the Tele position Pt. This means that it is possible to increase the movement range of the lens groups 101 to 103 of the zoom lens system 1 relative to the length in the optical axis L direction of the rotating barrel 60. Also, by achieving a wide range of movement for the lens groups 101 to 103 of the zoom lens system 1, it is possible to increase the positional precision for the respective positions of the lens groups 101 to 103.

That is, the operation (driving mechanism) of the rotating barrel 60 with respect to the fixed barrel 90 is achieved through two types of engagement, that is, engagement (fitting together, coupling) of the tabs 62 and the first and second helicoidal groove sections 95a and 95b of the helicoidal grooves 92a to 92c and engagement (fitting together, coupling) of the tabs 62 and the circumferential grooves 96 on the middle portion and circumferential grooves 97 on the end portion. Due to the former engagement, the tabs 62 move along the helicoidal groove sections 95a and 95b formed in a spiral (or so-called "helicoid") to produce movement where the rotating barrel 60 extends outward. The latter engagement is movement where the rotating barrel 60 merely revolves with the flat tabs 62 that extend in the circumferential direction inserted in the circumferential grooves 96 and 97, and is typically a movement where the rotating barrel 60 revolves with the rotating barrel 60 and the fixed barrel 90 in bayonet-type engagement.

The fixed barrel 90 of the lens holder 2 is the outermost member of the lens holder 2, has other elements housed inside, and is an essential member in achieving sufficient strength for the lens holder 2. In addition, the fixed barrel 90 is also the part that mechanically connects the lens holder 2 to the housing (body) 131 of the camera 130. The rotating barrel 60 functions to mechanically connect to the fixed barrel 90 and rotates the other barrels 50 and 10 in synchronization with the rotating barrel 60 to control the positions of the lens groups 101 to 103. Accordingly, in the lens holder 2 and the zoom lens system 1 equipped with the lens holder 2, to achieve a sufficient optical performance and mechanical performance for the lens holder 2, it is important to stabilize the connection between the fixed barrel 90 and the rotating barrel 60, and in particular, the mechanical connection in the optical axis L direction.

According to the lens holder 2, by using the helicoidal groove sections (groove portions) 95a and 95b on multiple stages, the range where the rotating barrel 60 and the fixed barrel 90 are capable of rotating due to the circumferential grooves 96 and 97 with a mechanically-strong bayonet-like connection is expanded. In addition, by extending the lens holder 2 through the use of helicoidal-type groove sections 95a and 95b that have simple spiral forms, it is possible to move in the direction of the optical axis L without rattling and without the flat tabs 62 that extend in the circumferential direction becoming stuck. This means that by assigning movement in the magnification range from the Wide to the Tele position to the range in which the rotating barrel 60 can rotate due to the circumferential grooves 96 and 97, it is possible to increase the control range in which the magnification range can be controlled by movement of the motor 133, to increase the range of movement of the lens groups 101 to 103, and to realize more precise movement of the lens groups 101 to 103. There is also greater design freedom for the cam grooves used to drive the lens groups, such as the ability to make the slope of the cam grooves more gradual, which means that the lens groups 101 to 103 can be driven smoothly.

In the examples shown in FIGS. 11 and 12, helicoidal groove sections 95a and 95b on two stages are used. The base side end 95r of the base portion side 90b of the first helicoidal groove section 95a on the first stage is the parked position (storage state) Pp where the lens holder 2 is folded up in the state shown in FIG. 3, the lens holder 2 is stored in the fixed barrel 90, and is stored in the body (housing) 131 of the image pickup apparatus 130. When the rotating barrel 60 is rotationally driven, the tabs 62 move in the first helicoidal groove sections 95a from the base side ends 95r at the base portion sides 90b to the tip side ends 95s at the end portion sides 90a. During such time, the rotating barrel 60 extends outward from the fixed barrel 90, and together with this, other barrels 50 and 10 also extend outward.

The position where the rotating barrel 60 has been rotationally driven further and the tabs 62 have moved from the tip side ends 95s at the end portion sides 90a of the first helicoidal groove sections 95a to the middle circumferential grooves 96 is the Wide position Pw shown in FIG. 2. Between the parked position Pp and the Wide position Pw, the motor 133 does not stop the rotation of the rotating barrel 60 both when the lens holder 2 extends outward and when the lens holder 2 is stored away. The Wide position Pw is the first position where image pickup can actually be carried out by the image pickup apparatus (camera) 130, and is the position where the camera 130 is used most frequently. At the Wide position Pw, the tabs 62 are inside the middle circumferential grooves 96. For this reason, compared to a state where the tabs 62 are midway on the first helicoidal groove sections 95a, movement in the optical axis L direction of the tabs 62 is restricted by the middle circumferential grooves 96, which means that the fixed barrel 90 and the rotating barrel 60 are connected in a mechanically strong state. Accordingly, it is possible to hold the lens holder 2 in a comparatively strong state even if an external force of a certain magnitude is applied to the camera 130, making it possible to prevent problems such as blurring of focus.

The position where the rotating barrel 60 has been rotated further and the tabs 62 enter the second helicoidal groove sections 95b from the middle circumferential grooves 96 and have moved from the base side ends 95t at the base portion side 90b of the second helicoidal groove sections 95b to the tip side ends 95u at the end portion side 90a and further into the end portion circumferential grooves 97 is the second zoom position P2 where the lens holder 2 stops next. The rotating barrel 60 extends outward a little more due to the second helicoidal groove sections 95b and the other barrels 50 and 10 respectively move the lens groups 101 and 102 to positions that realize magnification. The motor 133 does not stop rotating the rotating barrel 60 between the Wide position Pw and the second zoom position P2. This means that the camera 130 will not be used in a state where the tabs 62 are present midway on the second helicoidal groove sections 95b and during magnification, the lens holder 2 is used with the fixed barrel 90 and the rotating barrel 60 in a mechanically strong state with at least some of the tabs 62 inserted in the middle circumferential grooves 96 or the end portion circumferential grooves 97. Accordingly, even during magnification, it is possible to hold the lens holder 2 in a comparatively strong state even if an external force of a certain magnitude is applied to the camera 130, making it possible to prevent problems such as blurring of focus.

When the rotating barrel 60 is rotationally driven still further, the tabs 62 move in the circumferential grooves 97 on the end portion and pass the third to fifth positions to a final end 97t of the circumferential grooves 97. This final end 97t is the Tele position Pt shown in FIG. 7. By using the middle circumferential grooves 96, it is possible to expand the rotational range from the Wide position Pw to the Tele position Pt and as shown in FIG. 12, the Tele position Pt can be set at a position that is beyond the adjacent Wide position Pw. That is, it is possible to set the rotational range from the Wide position Pw to the Tele position Pt larger than the 120° used in the past, and with the two-stage helicoidal groove sections 95a and 95b of the present embodiment, such rotational range can be expanded to around 240°.

Although it depends on other conditions for the rotating barrel 60 and the fixed barrel 90, it is also possible to use helicoidal groove sections on three or more stages and to further expand the rotational range from the Wide position Pw to the Tele position Pt. The setting of the stopping positions is also not limited to the examples described above and the stopping positions may be positions (angles) where the tabs 62 have entered a number of circumferential grooves. Also, if the increase in the time spent moving from a stopping position to a next position is not considered, by expanding the rotational range from the Wide position Pw to the Tele position Pt, it is possible to provide a zoom lens system 1 with a higher magnification ratio. It is also possible to provide a zoom lens system 1 that is capable of further improving the precision of positional control of a large number of lens groups.

As described above, according to the lens holder 2 and the zoom lens system 1 equipped with the lens holder 2, it is possible, even if engagement between the fixed barrel 90 and the rotating barrel 60 is maintained at three positions, to increase the angle of rotation that can be used to control zooming to 120° or above. Accordingly, the lens holder 2 and the zoom lens system 1 equipped with the lens holder 2 have many advantages in that it is possible to increase the ratio of the distance extended by the lens holder 2 to the size of the lens holder 2 during storage, to improve the ratio of the controllability of the lens holder 2 during magnification to the size of the lens holder 2 during storage, and to improve the ratio of the controllability of the lens holder 2 during magnification to the diameter of the lens holder 2. This means that by using the lens holder 2, it is possible to provide a zoom lens system 1 with a high magnification ratio that is capable of being stored in a slimmer and/or more compact body 131.

Note that the zoom lens system 1 described above is capable of being stored in the body of a slimmer apparatus and can be used not only in an image pickup apparatus but also in other apparatuses equipped with lenses, such as a projector apparatus, with the zoom lens system 1 being especially favorable for portable apparatuses.

Figure 13:
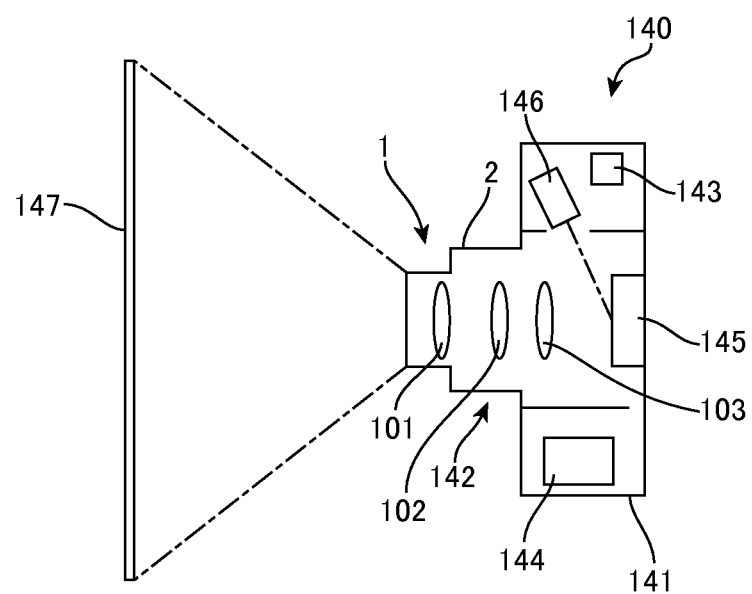
FIG. 13 is a diagram showing the overall construction of one example of a projector apparatus.

FIG. 13 shows the overall construction of one example of a projector apparatus equipped with the zoom lens system 1 described above. The projector apparatus 140 according to this embodiment is a small (handy-type) projector and includes a housing 141, a projector module 142 including the zoom lens system 1, a control unit 143 that controls the projector apparatus 140, and a motor 144 for driving the zoom lens system 1.

The projector module 142 includes a zoom lens system 1 and an image forming unit 145 housed in the fixed barrel 90 provided in the zoom lens system 1. In the projector module 142 according to the present embodiment, the image forming unit 145 is disposed to the rear along the optical axis L of the zoom lens system 1. The image forming unit 145 is a unit that forms images to be projected by the zoom lens system 1 and representative examples are a reflective-type image forming unit 145 such as a DMD and a transmissive-type image forming unit 145 such as an LCD. The projector apparatus 140 further includes a light source 146. As the light source 146, it is possible to use an LED light source, for example.

In the projector apparatus 140, due to the zoom lens system 1, images formed by the image forming unit 145 can form images with different magnification on a medium such as a screen 147 disposed in front of (i.e., optically in front of) the projector apparatus 140. In addition, according to the projector apparatus 140, since the zoom lens system 1 described above is used, it is possible to make the thickness in the optical axis L direction slimmer. Accordingly, it is possible to make the carrying size more compact.

In addition, the first cam barrel 10 of the lens holder 2 described above supports the first lens frame 70 and is also capable of receiving and supporting the second lens frame 80 so as to change the distance between the first lens group 101 and the second lens group 102. That is, the first cam barrel 10 includes, in addition to the first cam grooves 11, the second cam grooves 12 that change the position of the second lens frame 80 along the optical axis. The range of magnification (zoom range) of the lens holder 2 includes the first magnification range (first zoom range) Z1 and the second magnification range (second zoom range) Z2, and when a magnification operation is carried out for the lens holder 2 which moves from the second magnification range Z2 to the first magnification range Z1 or in the opposite direction, at the boundary between the magnification ranges, the second lens frame 80 transfers (moves over) from a state where the second lens frame 80 is supported by the second cam barrel 20 to a state where the second lens frame 80 is supported by the first cam barrel 10.

In the first magnification range Z1, the first lens frame 70 and the second lens frame 80 are supported by the first cam barrel 10, the second lens frame 80 is moved forward and back along the optical axis by the second cam grooves 12 of the first cam barrel 10 and the distance in the optical axis direction between the first lens group 101 and the second lens group 102 is changed. On the other hand, the second cam barrel 20 includes the third cam grooves 21 that change the distance between the base (fixed barrel) 90 that supports the lens holder 2 and the first cam barrel 10. The third cam barrel 30 includes fourth cam grooves 31 that change the distance between the base 90 and the second cam barrel 20. This means that in the second magnification range Z2, the first lens frame 70 is supported by the first cam barrel 10 and the second lens frame 80 is moved forward and back along the optical axis by the fourth cam grooves 31 of the third cam barrel 30 while being supported by the second cam barrel 20 to change the distance in the optical axis direction between the first lens group 101 and the second lens group 102.

In the first magnification range Z1, the distance can be adjusted within the range of the first cam barrel 10 in a state where the first lens group 101 and the second lens group 102 are close together. On the other hand, in the second magnification range Z2, the adjustment range for the distance between the first lens group 101 and the second lens group 102 is the range of the first cam barrel 10, the second cam barrel 20, and the third cam barrel 30, and the distance can be controlled in a state where the first lens group 101 and the second lens group 102 are apart. This means that the lens holder 2 has a wide range of adjustment for the distance between the first lens group 101 and the second lens group 102. Also, the range of possible magnification with the lens holder 2 is not a single multistage cam barrel but can be expanded to a plurality of cam barrels. This means that it is possible to increase the range of adjustment for the distance between the first lens group 101 and the second lens group 102 without enlarging the lens holder. Accordingly, if the zoom ratio is kept the same, it is possible to store the lens holder 2 in a slimmer base, such as the body (housing, case) of an apparatus. Alternatively, without changing the size of the base storing the lens holder, it is possible to achieve a larger range of movement for the lenses and increase the zoom ratio.

The second cam grooves 12 of the first cam barrel 10 include parts that are open in the direction of the second cam barrel 20 along the optical axis so as to allow the second cam pins 81 of the second lens frame 80 that moves together with the second cam barrel 20 to enter. Since the second lens frame 80 advances linearly along the optical axis in the magnification range, it is easy for the second lens frame 80 to transfer from the state where the second lens frame 80 is supported by the first cam barrel 10 to the state where the second lens frame 80 is supported by the second cam barrel 20. By having the first cam barrel 10 rotate when the second lens frame 80 transfers from the second cam barrel 20 to the first cam barrel 10, the second cam pins 81 are picked up by the open parts of the second cam grooves 12, and by having the first cam barrel 10 rotate in the opposite direction when the second lens frame 80 moves from the first cam barrel 10 to the second cam barrel 20, it is possible for the second cam pins 81 to be released by the open parts of the second cam grooves 12 and for the second lens frame 80 to move from the first cam barrel 10 to the second cam barrel 20.

In addition, the boundary between the first magnification range Z1 and the second magnification range Z2 of the first cam grooves 11 of the first cam barrel 10 is formed so as to be perpendicular or almost perpendicular to the optical axis, so that when the second lens frame 80 transfers between the first cam barrel 10 and the second cam barrel 20, movement of the first lens frame 70 in the optical axis direction is limited and the load of the first cam barrel 10 during such transfer is reduced. In the same way, the boundaries between the first magnification range Z1 and the second magnification range Z2 of the third cam grooves 21 and the fourth cam grooves 31 are formed so as to be perpendicular to the optical axis. This means that when the second lens frame 80 is transferred, the second cam barrel and the third cam barrel do not move forward and back along the optical axis and the transferring can be carried out more reliably. The boundary between the first magnification range Z1 and the second magnification range Z2 is also between (for example, in the middle) of adjacent zoom positions and the transferring is carried out reliably without the movement of the second lens frame 80 stopping while the second lens frame 80 is being transferred.

The lens holder 2 includes the coil spring 110 as a means for biasing the second lens frame 80 in the direction of the second cam barrel 20 and the second cam barrel 20 includes a part (guide mechanism), in the present embodiment, the guide pins 121 and the through-holes 122, that receives the second lens frame 80 pressed by the coil spring 110. Since the second lens frame 80 is capable of moving together with the second cam barrel 20, the positional precision of the second lens frame 80 in the second magnification range Z2 can be improved.

Accordingly, it is possible to provide a lens holder 2 whose carrying size is even more compact and has a wide magnification range.

Note that although the camera 130 and the projector 140 equipped with the zoom lens system 1 have been given as examples in the above description, the zoom lens system 1 and the lens holder 2 included in the zoom lens system 1 can be favorably used in all optical products (optical apparatuses) where it is desirable for the lens to be retractable and/or for the lens length to shorten during storage.

Also, although an example where the helicoidal groove sections are divided into two stages has been described above, it is sufficient to divide the helicoidal groove sections into at least two stages and division into three or more stages is also possible. When doing so, a plurality of the middle circumferential grooves may be provided and disposed so as to connect the helicoidal groove sections (the tip side end of the helicoidal groove section on the base side and the base side end of the helicoidal groove section on the end side), and the circumferential groove on the end portion may be disposed so as to join the tip side end of the helicoidal groove section closest to the end portion side.

In addition, although the zoom lens system 1 composed of three lens groups in the form of the first to third lens groups 101, 102, and 103 has been described above as an example, it is also possible to apply the present invention to a zoom lens system with a two lens group construction including first and second lens groups or to a zoom lens system with a multiple lens group construction including four or more lens groups.

The invention claimed is:
1. A lens holder comprising:
a first barrel including a plurality of helicoidal grooves that extend from a base portion to an end portion at positions with rotational symmetry;
a second barrel including a plurality of protrusions that respectively enter the plurality of helicoidal grooves; and
a lens frame that is supported on at least one of the first barrel and the second barrel via at least one other barrel and has at least one lens attached thereto,
wherein the plurality of helicoidal grooves respectively include helicoidal groove sections in multiple stages that are connected by circumferential grooves on a middle portion that guide the protrusions in the circumferential direction, and
the first barrel includes circumferential grooves on the end portion that join to end sides of the helicoidal groove sections closest to the end side out of the helicoidal groove sections in multiple stages and guide the protrusions in the circumferential direction.
2. The lens holder according to claim 1,
wherein the plurality of helicoidal grooves include a first helicoidal groove and a second helicoidal groove that is adjacent to the first helicoidal groove, and
at least part of a circumferential groove on the end portion of the first helicoidal groove is disposed so as to overlap one of an end side of the helicoidal groove section closest to a base side of the second helicoidal groove and a circumferential groove on middle portion joined thereto.
3. The lens holder according to claim 1,
wherein the lens holder has a plurality of zoom positions where movement in an optical axis direction automatically stops, and at the plurality of zoom positions, the plurality of protrusions are inserted in the circumferential grooves on the middle portion or the end portion.

4. The lens holder according to claim 1, wherein the plurality of protrusions are tabs that extend in the circumferential direction.

5. The lens holder according to claim 1, wherein the first barrel is an outermost part of the lens holder.

6. The lens holder according to claim 1, wherein the plurality of helicoidal grooves include three helicoidal grooves disposed at three positions with rotational symmetry, the three helicoidal grooves are each divided into helicoidal groove sections in two stages with a first helicoidal groove section at the base side and the second helicoidal groove section at the end side disposed at angles that do not overlap, and the first barrel includes:

the circumferential grooves on the middle portion that connect the end side of each first helicoidal groove section and the base side of each second helicoidal groove section; and the circumferential grooves on the end portion that join to end sides of the second helicoidal groove sections.

7. A zoom lens system comprising:
a lens holder according to claim 1; and
at least one lens held in the lens frame of the lens holder.

8. An image pickup apparatus comprising:
a zoom lens system according to claim 7; and
an image pickup unit that acquires an image formed by the zoom lens system.

9. A projector apparatus comprising:
a zoom lens system according to claim 7; and
an image forming unit that forms an image to be projected by the zoom lens system.

* * * * *